United States Patent
Singh et al.

(10) Patent No.: US 9,235,559 B2
(45) Date of Patent: Jan. 12, 2016

(54) PROGRESSIVE PAGE LOADING

(75) Inventors: Harvinder P. Singh, Redmond, WA (US); Ahmet Gurcan, Mercer Island, WA (US); Arindam Basak, Redmond, WA (US); Jesse D. McGatha, Sammamish, WA (US); Justin A. Slone, Seattle, WA (US); Jerry J. Dunietz, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1609 days.

(21) Appl. No.: 12/061,627

(22) Filed: Apr. 2, 2008

(65) Prior Publication Data

US 2009/0254807 A1    Oct. 8, 2009

(51) Int. Cl.
```
G06F 17/00    (2006.01)
G06F 17/22    (2006.01)
G06F 17/21    (2006.01)
G06F 17/24    (2006.01)
G06F 17/30    (2006.01)
```

(52) U.S. Cl.
CPC .......... *G06F 17/2247* (2013.01); *G06F 17/212* (2013.01); *G06F 17/24* (2013.01); *G06F 17/30905* (2013.01)

(58) Field of Classification Search
CPC .............. G06F 17/217; G06F 17/2047; G06F 17/30899; G06F 17/30902; G06F 17/30905; G06F 17/30908; G06F 17/211; G06F 17/214; G06F 17/2205; G06F 17/2229; G06F 17/2258; G06F 17/2264; G06F 17/227; G06F 17/2247; H04L 67/02; H04L 67/2847; Y10S 707/99945; Y10S 707/99943
USPC ......... 715/205, 209, 227, 230, 233–235, 700, 715/705, 781; 709/217–219, 227, 246
See application file for complete search history.

(56) References Cited

U.S. PATENT DOCUMENTS

| | | | |
|---|---|---|---|
| 5,737,599 A * | 4/1998 | Rowe et al. ............................ 1/1 |
| 5,778,372 A * | 7/1998 | Cordell et al. ........................ 1/1 |
| 5,819,301 A * | 10/1998 | Rowe et al. .................... 715/235 |
| 7,007,237 B1 | 2/2006 | Sharpe |
| 7,092,967 B1 | 8/2006 | Pannala et al. |
| 7,210,097 B1 | 4/2007 | Clarke et al. |
| 7,363,582 B2 * | 4/2008 | Sylthe et al. .................. 715/234 |

(Continued)

OTHER PUBLICATIONS

S. Lippens, "Reading OpenDocument office files from Python," © Jan. 20, 2006, downloaded from <http://stefaanlippens.net/opendocumentpython>, 3 pages.*

(Continued)

*Primary Examiner* — Cesar Paula
*Assistant Examiner* — James H Blackwell
(74) *Attorney, Agent, or Firm* — Sunah Lee; Kate Drakos; Micky Minhas (57) ABSTRACT

Various embodiments provide an ability to load documents and access page content associated with documents while the documents are still being loaded. In at least some embodiments, while a document's structure is being processed in the background, individual pages can be requested. The same can be said for individual documents that comprise a part of a package that contains multiple documents. In at least some embodiments, multiple threads are utilized to enable a document's structure to be built and to enable a user to access portions of the document while the document is being built or loaded.

20 Claims, 5 Drawing Sheets

(56) References Cited

U.S. PATENT DOCUMENTS

| | | | |
|---|---|---|---|
| 7,810,024 B1* | 10/2010 | Goldman | 715/234 |
| 8,145,766 B2* | 3/2012 | Dumitru et al. | 709/227 |
| 2003/0103071 A1 | 6/2003 | Lusen et al. | |
| 2003/0115295 A1* | 6/2003 | Potts et al. | 709/219 |
| 2006/0069984 A1 | 3/2006 | Jaeger | |
| 2007/0106946 A1 | 5/2007 | Goetz et al. | |
| 2007/0136659 A1 | 6/2007 | Adelberg et al. | |
| 2007/0186182 A1 | 8/2007 | Schiller | |

OTHER PUBLICATIONS

OASIS, "Open by Design, The Advantages of the OpenDocument Format (ODF)," © Dec. 10, 2006, OASIS ODF Adoption TC, pp. 1-14.*

J.D. Eisenberg,"OASIS OpenDocument Essentials, Using OASIS OpenDocument XML," © 2005, 293 pages.*

W. Ditch,"XML-based Office Document Standards," Aug. 2007, JISC, 49 pages.*

Adobe,"PDF Reference, 5th Edition, Version 1.6, Appendix F. Linearized PDF," © 2005, Adobe Systems Inc., pp. 629-649.*

Robie, J.,"What is the Document Object Model," © 1998, W3C, 7 pages.*

Meltzer et al., "The Addressing Model of the Open Packaging Conventions", Jun. 2006, Microsoft Corporation, pp. 13.

"XF Rendering Server 2008", Ecrion Software Inc. 2002-2007, pp. 2.

Watson, "A First Look at APIs for Creating XML Paper Specification Documents" Microsoft Corporation, 2008, pp. 9, appears to have been published in MSDN Mag. Jan. 2006.

* cited by examiner

PROGRESSIVE PAGE LOADING

BACKGROUND

In many scenarios, electronic documents may have a large number of pages. When a user wishes to load a document and access individual pages of the document, typical scenarios load the entire document before allowing a user to access portions of the document. For small documents this does not constitute much of a problem. However, for larger documents, the overhead associated with loading the entire document prior to allowing user access can create undesirable delays for the user.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide an ability to load documents and access page content associated with documents while the documents are still being loaded. That is, access to documents can be provided during the process of document loading such as, for example, those instances where a document may be in the process of being received via a communication link such as the Internet. In this manner, third-party reader applications or readers can access pages without necessarily knowing how many pages are contained in a particular document.

In at least some embodiments, while a document's structure is being processed in the background, individual pages can be requested. The same can be said for individual documents that comprise a part of a package that contains multiple documents.

In at least some embodiments, multiple threads are utilized to enable a document's structure to be built and to enable a user to access portions of the document while the document is being built or loaded.

BRIEF DESCRIPTION OF THE DRAWINGS

The same numbers are used throughout the drawings to reference like features.

DETAILED DESCRIPTION

Overview

Various embodiments provide an ability to load documents and access page content associated with documents while the documents are still being loaded. That is, access to documents can be provided during the process of document loading such as, for example, those instances where a document may be in the process of being received via a communication link such as the Internet. In this manner, third-party reader applications or readers can access pages without necessarily knowing how many pages are contained in a particular document.

In at least some embodiments, while a document's structure is being processed in the background, individual pages can be requested. The same can be said for individual documents that comprise a part of a package that contains multiple documents.

In at least some embodiments, multiple threads are utilized to enable a document's structure to be built and to enable a user to access portions of the document while the document is being built or loaded.

In the discussion that follows, a section entitled "Operating Environment" describes but one operating environment that can be utilized to practice the inventive principles described herein in accordance with one or more embodiments. Following this, a section entitled "Progressive Loader—Example" is provided and describes a progressive loader in accordance with one or more embodiments. Following this, a section entitled "Implementation Example" describes an example implementation in accordance with one or more embodiments. Next, a section entitled "Internal Implementation of Progressivity (Read Only)" describes an internal implementation in accordance with one or more embodiments. Following this, a section entitled "Internal Implementation of Progressivity (Read/Write)" describes an internal implementation in accordance with one or more embodiments. Last, a section entitled "Example System" describes an example system that can be utilized to implement one or more embodiments.

Operating Environment

Figure 1:
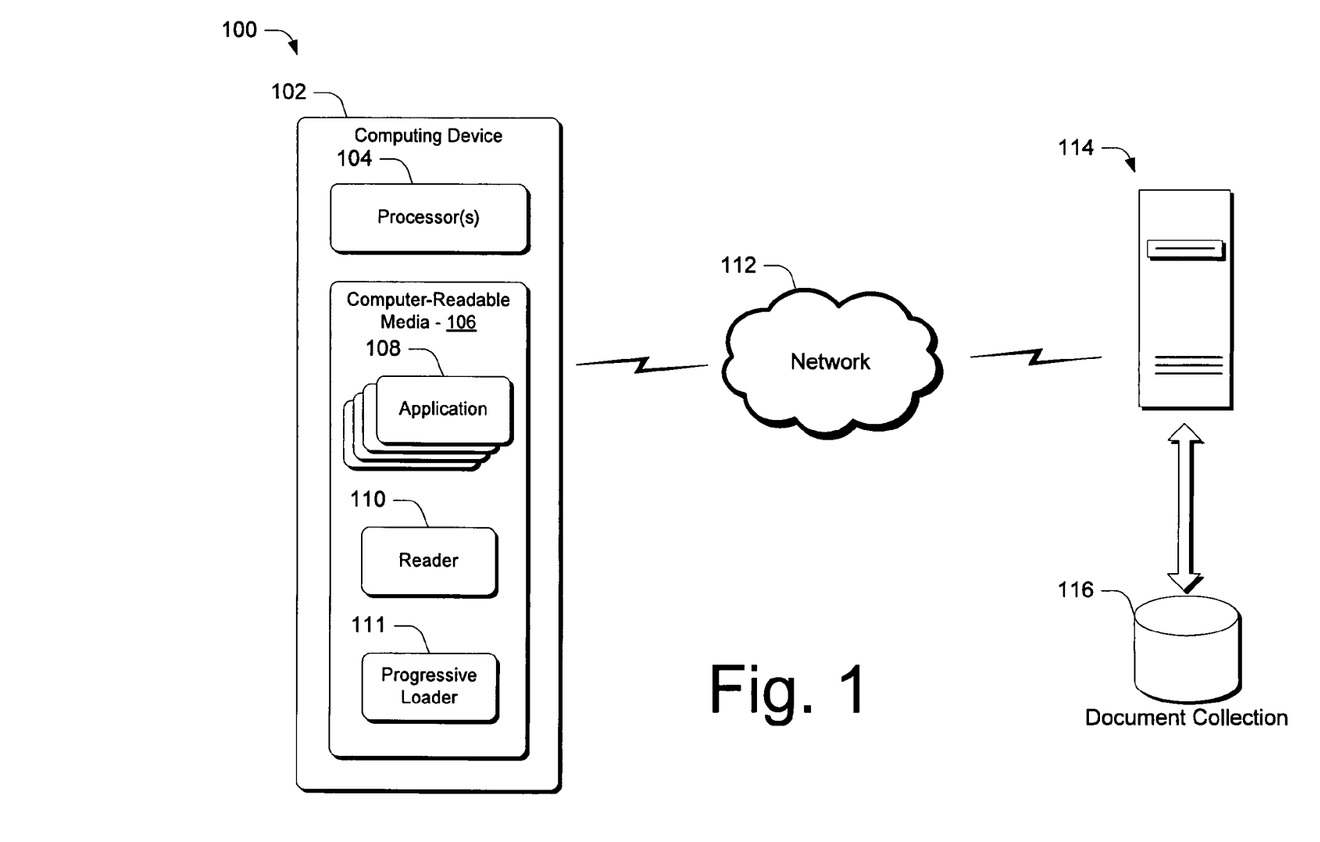
FIG. 1 illustrates an operating environment in accordance with one or more embodiments.

FIG. 1 illustrates an operating environment in accordance with one or more embodiments, generally at 100. Operating environment 100 includes a computing device 102 having one or more processors 104, one or more computer-readable media 106 and one or more applications 108 that reside on the computer-readable media and which are executable by the processor(s). The computer-readable media can include, by way of example and not limitation, all forms of volatile and non-volatile memory and/or storage media that are typically associated with a computing device. Such media can include ROM, RAM, flash memory, hard disk, removable media and the like. In addition, computing device 102 includes an application in the form of a reader 110. In the illustrated and described embodiment, reader 110 is configured to enable a user to access and consume various documents. The documents can be in any suitable format. In at least some embodiments, the reader is configured to enable a user to access and consume documents that conform to the XML Paper Specification (XPS) Version 1.0. The XML Paper Specification describes XPS documents and how they are organized internally and rendered externally. The XML Paper Specification builds on the Open Packaging Conventions. The XML Paper Specification describes how producers can create document files or, more generally, any stream of bytes, in the XPS document format, and how consumers can access, render, or process the contents of an XPS document. An XPS document, as described below in more detail, comprises a paginated set of related pages. The pages have a fixed layout, are organized into one or more fixed documents, and stored according to the Open Packaging Conventions. A consumer of an XPS document would typically use a reader such as reader 110 to access and consume an XPS document.

Further, computing device 102 includes a progressive loader 111 that is used to provide progressivity so that documents or portions of documents can be accessed while a document is in the process of loading. Functionality of the progressive loader is described in more detail below.

In addition, environment 100 includes a network 112, such as a local network or the Internet, via which documents can be received. Documents can be received from any suitable source. For example, in at least some embodiments, documents can be received over network 112 by way of a server 114 that has access to a document collection such as document collection 116. In at least some instances, documents can be streamed to computing device 102 using any suitable streaming format. In at least some embodiments, one or more documents can be packaged in a package that is compliant with the XPS specification, an example of which is provided below.

Computing device 102 can be embodied as any suitable computing device such as, by way of example and not limitation, a desktop computer, a portable computer, a handheld computer such as a personal digital assistant (PDA), cell phone, and the like. One example of a computing device is shown and described below in relation to FIG. 5.

Having discussed the general notion of an example operating environment in which various embodiments can operate, consider now a discussion of a progressive loader in accordance with one or more embodiments.

Progressive Loader

Example

Figure 2:
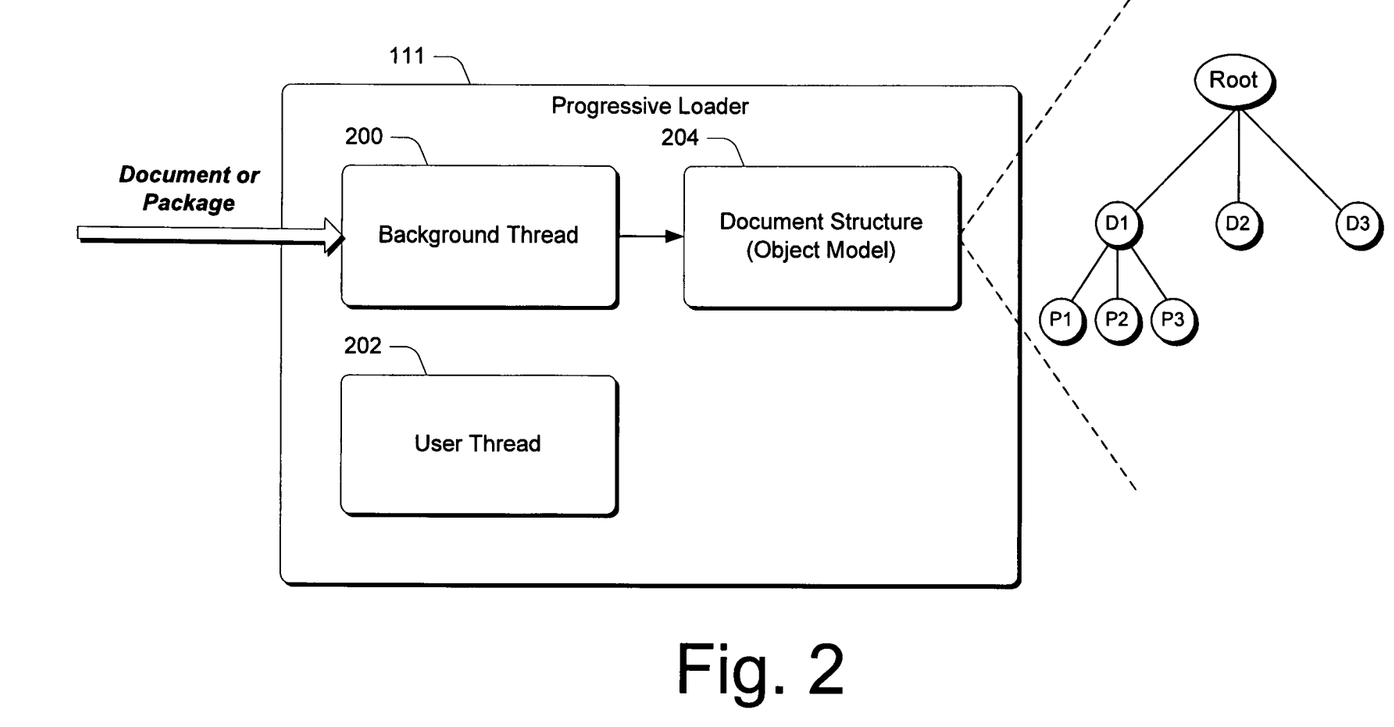
FIG. 2 illustrates a progressive loader in accordance with one or more embodiments.

FIG. 2 illustrates an example of a progressive loader 111 in accordance with one or more embodiments. In one or more embodiments, the progressive loader is implemented in software. In this example, progressive loader 111 includes or otherwise makes use of a background thread 200, a user thread 202 and a document structure (object model) 204.

In one or more embodiments, a document or package can be described in markup language such as XML or XAML. The markup language describes the document or package and its constituent parts. One example of this is provided below in the section entitled "Implementation Example".

In this example, as progressive loader 111 receives a document or package, background thread 200 is used to parse the document or package description and build a document structure or object model 204. In the present example, document structure 204 includes a root node and multiple direct children nodes each of which represents a different document, e.g., documents D1, D2, and D3. In turn, each of the documents can have multiple different pages such as, for document D1's page 1 (P1), page 2 (P2), and page 3 (P3). Each page can have one or more resources associated with it. Examples of resources include, by way of example and not limitation, text, fonts, images and the like. In one or more embodiments, when the background thread builds an object model, the object model is not initially populated with the content of a document. Rather, references to a document and its constituent parts are provided in the object model. As the object model is built, the user thread 202 can be used to enable a user to call into the object model to consume portions of an associated document. That is, the object model exposes APIs that can be used by the user thread to call into and receive portions of a document.

In one or more embodiments, the object model can be used by user thread 202 to access portions of a document as the entire object model is built for a particular document or package. As an example, consider the following two scenarios.

First, as the object model is being built, a user, through an associated reader application, may wish to load the first page of a particular document. Responsive to interacting with their reader application, an API call can be made to the object model to retrieve the first page. If the object model has been built sufficient that the first page is represented in the object model, then the object model's reference to the first page can be used to retrieve and load the first page for the user. Alternately or additionally, if the object model has not yet been built such that the first page is represented by the object model, the user thread can be blocked until the object model's first page representation is built. Then, the first page can be loaded for the user. In one or more embodiments, this response is returned on the user thread. Alternately or additionally, if the object model has not yet been built such that the first page for a particular document is represented, the background thread 200 can skip ahead in its processing of the document or package to locate the document's first page, build its object model representation, and then access and load the requested first page. In this instance, the user thread is still blocked. The background thread just prioritizes this request and skips ahead in the processing. Once the object model is loaded sufficient to satisfy this request, the user thread is unblocked and the response to the request gets returned on the user thread.

Second, a user may wish to ascertain how many documents are contained in a particular package. In this case, the object model can be used through its APIs to enable a call to be made to ascertain how many documents are contained within the package. If the object model has been built such that all of the documents are represented in it, the object model can return to the user with an indication of the documents contained within the package. For example, in at least some embodiments, a somewhat shallow object model can be built to the document level to expedite processing in this case. If, on the other hand, the object model has not been built such that all of the documents are represented in it, the user thread can be blocked until the object model has been built to represent all of the documents. At this time, the object model can return to the user with an indication of all of the documents contained within the package. Alternately or additionally, if the object model has not yet been built such that all of the documents are represented by the object model the background thread 200 can skip ahead in its processing to locate all of the documents, build its object model representation, and then respond to the user.

Hence, in the above-described embodiment, two different threads are utilized to enable progressivity in the loading and consumption of a package that can contain multiple documents. A first thread, referred to above as the "background thread", collects information associated with the package and its constituent portions. The first thread processes the package and builds the relevant object model that can be used to access portions of documents contained within the package. It does this by ascertaining the root of the package, a number of documents contained in the package, how many pages are contained within each document, and where the documents and pages are located. A second thread, referred to as the "user thread", receives user input such as input associated with rendering a particular page or document. In this instance, the user acting through an associated reader application generates API calls such as "GetPackage", "GetDocument1" or "GetPage1". The API calls are then used to traverse the document structure that is built or being built by the background thread.

As indicated above, in at least some embodiments and responsive to these API calls, if a particular part of a document or package that the user requests has not been loaded, the API call will block, and return to the user when the particular part of the document or package has been loaded. Alternately or additionally, the background thread can be interrupted and it can attempt to move ahead in the processing of the package in an attempt to locate the part of the document that the user has requested. The appropriate data can then be returned on the user thread.

Figure 3:
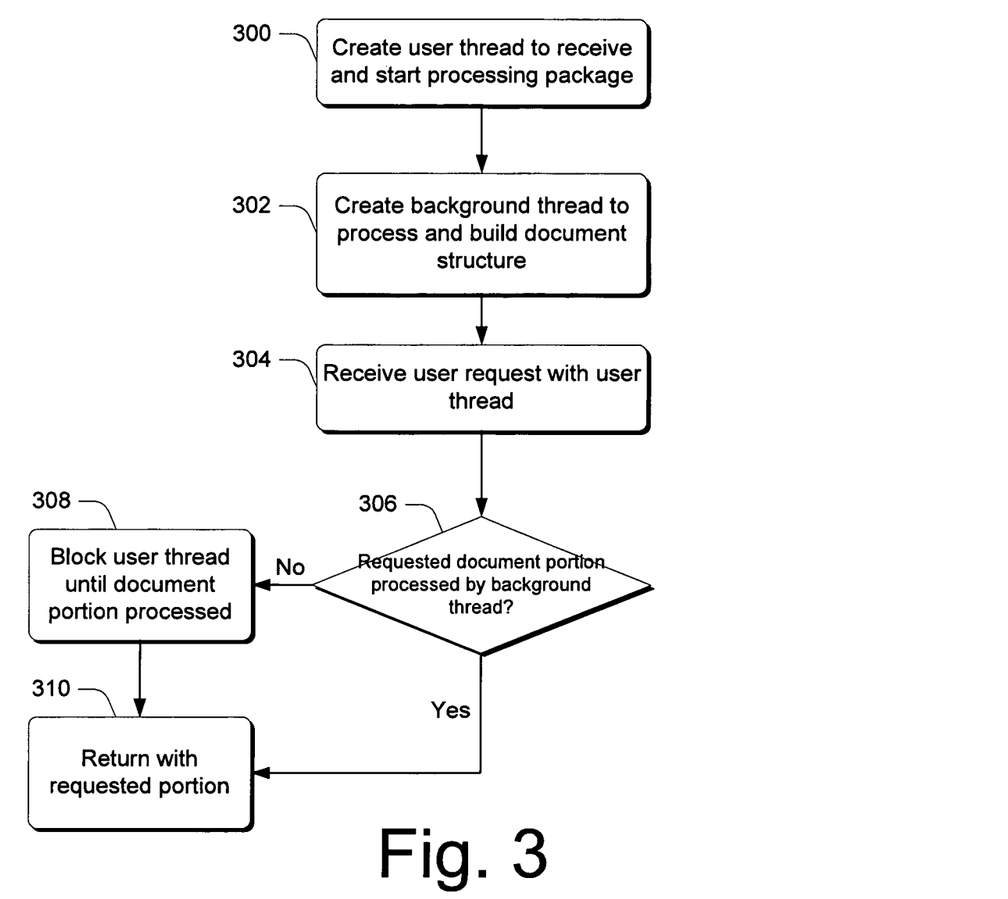
FIG. 3 is a flow diagram that describes a method in accordance with one or more embodiments.

FIG. 3 is a flow diagram that describes steps in a method in accordance with one or more embodiments. The method can be performed in connection with any suitable hardware, software, firmware, or combination thereof. In at least some embodiments, at least portions of the method can be performed by a suitably-configured progressive loader 111, such as the one described above.

Step 300 creates a user thread to receive and start processing a package. In one or more embodiments, the package comprises an XPS package which is compliant with the XML Paper Specification (XPS) Version 1 or any subsequent versions of the XPS Specification. In one or more embodiments, part of processing the package can include creating, at 302, a background thread to process and build a document structure associated with the received package. In at least some embodiments, the background thread can be created by the user thread. In the example above, the document structure is represented as an object model that can receive API calls to access portions of one or more documents that are included in the package. Step 304 receives a user request with the user thread.

Step 306 ascertains whether a requested document portion has been processed by the background thread. If the requested document portion has not yet been processed by the background thread, as by being represented in the document's structure or object model, step 308 blocks the user thread until the requested document portion has been processed. In the illustrated and described embodiment above, the user thread is blocked until the requested document portion is represented in the document's structure or object model. Step 310 then returns with the requested document portion on the user thread.

If, on the other hand, step 306 ascertains that the requested document portion has been processed by the background thread, step 310 returns with the requested document portion on the user thread.

In this way, the user can access portions of the document in situations where the entire document has not yet been processed.

As an alternative, another possible design is to do the loading on the user thread itself, in response to the user request, while background thread keeps progressing through its own work.

Figure 4:
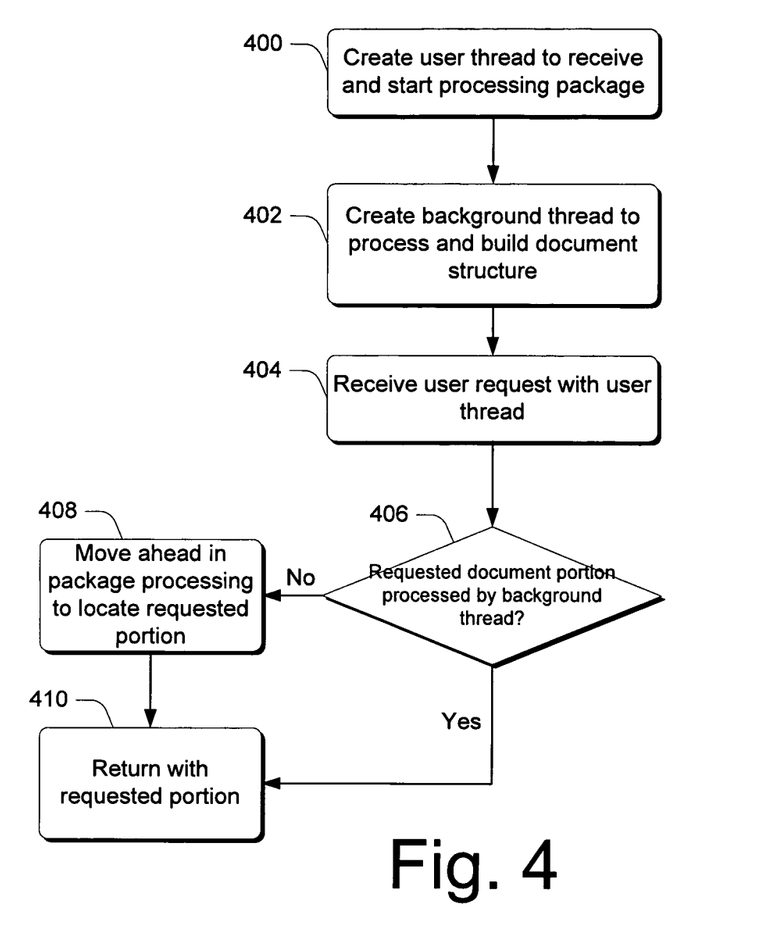
FIG. 4 is a flow diagram that describes a method in accordance with one or more embodiments.

FIG. 4 is a flow diagram that describes steps in a method in accordance with one or more embodiments. The method can be performed in connection with any suitable hardware, software, firmware, or combination thereof. In at least some embodiments, the method can be performed by a suitably-configured progressive loader 111, such as the one described above.

Step 400 creates a user thread to receive and start processing a package. In one or more embodiments, the package comprises an XPS package which is compliant with the XML Paper Specification (XPS) Version 1 or any subsequent versions of the XPS Specification. Step 402 creates a background thread to process and build a document structure associated with the received package. In one or more embodiments, the background thread can be created by the user thread. In the example above, the document structure is represented as an object model that can receive API calls to access portions of one or more documents that are included in the package. Step 404, receives, via the user thread, a user request associated with accessing documents or portions of one or more of the documents included in the package.

Step 406 ascertains whether a requested document portion has been processed by the background thread. If the requested document portion has not yet been processed by the background thread, as by being represented in the document's structure or object model, in at least some embodiments, the user thread can be blocked and step 408 moves ahead in package processing to locate the requested portion. That is, the background thread looks into the stream loading enough to locate the next level of content until a desired reference is found. Step 410 then returns with the requested document portion on the user thread.

If, on the other hand, step 406 ascertains that the requested document portion has been processed by the background thread, step 410 returns with the requested document portion on the user thread.

In this way, the user can access portions of the document in situations where the entire document has not yet been processed.

As an alternative, another possible design is to do the loading on the user thread itself, in response to the user request, while background thread keeps progressing through its own work.

Having now considered a progressive loader example, consider now an implementation example in which the principles described above can be implemented.

Implementation Example

The context of the example described just below is one in which a document package has been built to be compliant with the XML Paper Specification (XPS) Version 1. It is to be appreciated and understood that the various embodiments described in this document can be employed in connection with other standards that are different from the XPS standard without departing from the spirit and scope of the claimed subject matter. In addition, the various embodiments can be employed in connection with subsequent versions of the XPS Specification.

As a brief overview of the XPS standard, consider the following.

This XML Paper Specification, or XPS, describes the set of conventions for the use of XML and other widely available technologies to describe the content and appearance of paginated documents. It is written for developers who are building systems that process XPS content.

The XML Paper Specification describes a set of conventions for the use of XML and other widely available technologies to describe the content and appearance of paginated documents. It is written for developers who are building systems that process XPS content. One goal of XPS is to ensure the interoperability of independently created software and hardware systems that produce or consume XPS content. The XPS specification defines the formal requirements that producers and consumers satisfy in order to achieve interoperability.

The XPS specification describes a paginated-document format called the XPS Document. The format requirements are an extension of the packaging requirements described in the Open Packaging Conventions specification. That specification describes packaging and physical format conventions for the use of XML, Unicode, ZIP, and other technologies and specifications to organize the content and resources that make up any document.

The XPS Document format represents a set of related pages with a fixed layout, which are organized as one or more documents, in the traditional meaning of the word. A file or byte stream that implements this format includes everything that is used to fully render those documents on a display device or physical medium (for example, paper). This includes all resources such as fonts and images that might be used to render individual page markings.

In addition, the format includes optional components that build on the minimal set of components that are used to render a set of pages. This includes the ability to specify print job control instructions, to organize the minimal page markings into larger semantic blocks such as paragraphs, and to physically rearrange the contents of the format for easy consumption in a streaming manner, among others.

The XPS Document format uses a ZIP archive for its physical model. The Open Packaging Conventions specification describes a packaging model, that is, how the package is represented internally with parts and relationships. The XPS Document format includes a well-defined set of parts and relationships, each fulfilling a particular purpose in the document. The format also extends the package features, including digital signatures, thumbnails, and interleaving.

The packaging conventions described in the Open Packaging Conventions specification can be used to carry any payload. A payload is a complete collection of interdependent parts and relationships within a package. The XPS specification defines a particular payload that contains a static or "fixed-layout" representation of paginated content: the fixed payload.

A package that holds at least one fixed payload and follows the rules described in the XPS specification is referred to as an XPS Document. Producers and consumers of XPS Documents can implement their own parsers and rendering engines based on this specification.

XPS Documents address the requirements that information workers have for distributing, archiving, rendering, and processing documents. Using known rendering rules, XPS Documents can be unambiguously reproduced or printed without tying client devices or applications to specific operating systems or service libraries. Because the XPS Document is expressed in a neutral, application-independent way, the content can be viewed and printed without the application used to create the package.

A payload that has a FixedDocumentSequence root part is known as a fixed payload. A fixed payload root is a FixedDocumentSequence part that references FixedDocument parts that, in turn, reference FixedPage parts. There can be more than one fixed payload in an XPS Document.

A specific relationship type is defined to identify the root of a fixed payload within an XPS Document: the XPS Document StartPart relationship. The primary fixed payload root is the FixedDocumentSequence part that is referenced by the XPS Document StartPart relationship. Consumers such as viewers or printers use the XPS Document StartPart relationship to find the primary fixed payload in a package. The XPS Document StartPart relationship points to the FixedDocumentSequence part that identifies the root of the fixed payload.

The payload includes the full set of parts used to process the FixedDocumentSequence part. All content to be rendered is contained in the XPS Document. The parts that can be found in an XPS Document are listed the table just below, some of which are described in more detail below the table.

| Name | Description | Required/Optional |
| --- | --- | --- |
| FixedDocumentSequence | Specifies a sequence of fixed documents. | REQUIRED |
| FixedDocument | Specifies a sequence of fixed pages. | REQUIRED |
| FixedPage | Contains the description of the contents of a page. | REQUIRED |
| Font | Contains an OpenType or TrueType font. | REQUIRED if a <Glyphs> element is present |
| JPEG image PNG image TIFF image Windows Media Photo image | References an image file. | REQUIRED if an <ImageBrush> element is present |
| Remote resource dictionary | Contains a resource dictionary for use by fixed page markup. | REQUIRED if a key it defines is referenced |
| Thumbnail | Contains a small JPEG or PNG image that represents the contents of the page or package. | OPTIONAL |
| PrintTicket | Provides settings to be used when printing the package. | OPTIONAL |
| ICC profile | Contains an ICC Version 2 color profile optionally containing an embedded Windows Color System (WCS) color profile. | OPTIONAL |
| DocumentStructure | Contains the document outline and document contents (story definitions) for the XPS Document. | OPTIONAL |
| StoryFragments | Contains document content structure for a fixed page. | OPTIONAL |
| SignatureDefinitions | Contains a list of digital signature spots and signature requirements. | OPTIONAL |
| DiscardControl | Contains a list of resources that are safe for consumers to discard during processing. | OPTIONAL |

FixedDocumentSequence Part

The FixedDocumentSequence part assembles a set of fixed documents within the fixed payload. For example, a printing client can assemble two separate documents, a two-page cover memo and a twenty-page report (both are FixedDocument parts), into a single package to send to the printer.

The FixedDocumentSequence part is the only valid root of a fixed payload. Even if an XPS Document contains only a single fixed document, the FixedDocumentSequence part is still used. One FixedDocumentSequence part per fixed payload is used.

Fixed document sequence markup specifies each fixed document in the fixed payload in sequence, using <DocumentReference> elements. The order of <DocumentReference> elements determines document order and is preserved by editing consumers. Each <DocumentReference> element should reference a FixedDocument part by relative URI.

FixedDocument Part

The FixedDocument part is a common, easily indexed root for all pages within the document. A fixed document identifies the set of fixed pages for the document. The markup in the FixedDocument part specifies the pages of a document in sequence using <PageContent> elements. The order of <PageContent> elements determines page order and is preserved by editing consumers. Each <PageContent> element should reference a FixedPage part by relative URI.

FixedPage Part

The FixedPage part contains all of the visual elements to be rendered on a page. Each page has a fixed size and orientation. The layout of the visual elements on a page is determined by the fixed page markup. This applies to both graphics and text, which is represented with precise typographic placement. The contents of a page are described using a powerful but simple set of visual primitives.

Each FixedPage part specifies the contents of a page within a <FixedPage> element using <Path> and <Glyphs> elements (using various brush elements) and the <Canvas> grouping element. The <ImageBrush> and <Glyphs> elements (or their child or descendant elements) can reference Image parts or Font parts by URI. They should reference these parts by relative URI.

Image Parts

Image parts reference image files. A single image may be shared among multiple fixed pages in one or more fixed documents. Images referenced in markup are internal to the package. References to images that are external to the package are invalid.

Images are included in XPS Documents with an <ImageBrush> element and an ImageSource attribute to reference a part with the appropriate content type. XPS Documents support the following image formats: JPEG, PNG, TIFF, and Windows Media Photo.

Thumbnail Parts

Thumbnails are small images that represent the contents of a fixed page or an entire XPS Document. Thumbnails enable users of viewing applications to select a page easily. Thumbnail images may be attached using a relationship to the FixedPage parts. Each FixedPage part does not have more than one thumbnail part attached.

Although the Open Packaging Conventions specification allows thumbnails to be attached to any part, XPS Document consumers should process thumbnails associated via a package relationship from the package as a whole or via a relationship from a FixedPage part. These thumbnails are either in JPEG or PNG format. Thumbnails attached to any other part should be ignored by XPS Document consumers.

Font Parts

Fonts are stored in font parts. XPS Documents support the OpenType font format, which includes TrueType and CFF fonts. To support portability, Unicode-encoded fonts should be used.

Font parts are referenced using the FontUri attribute of the <Glyphs> element. A single font may be shared among multiple fixed pages in one or more fixed documents. Font references are internal to the package, thus, external references to fonts are invalid.

If the referenced font part is a TrueType Collection, the fragment portion of the URI indicates the font face to be used. The use of URI fragments is specified in the BNF of Generic URI Syntax specification. The fragment contained in the FontURI attribute value is an integer between 0 and n−1 inclusive, where n is the number of font faces contained in the TrueType Collection. For example, to reference the first font face in the font part " . . . /Resources/Fonts/CJKSuper.ttc", the value of the FontUri attribute is " . . . /Resources/Fonts/CJKSuper.ttc#0". If no fragment is specified, the first font face is used in the same way as if the URI had specified "#0".

Remote Resource Dictionary Parts

A remote resource dictionary allows producers to define resources that can be reused across many pages, such as a brush. This is stored in a Remote Resource Dictionary part.

PrintTicket Parts

PrintTicket parts provide user intent and device configuration information to printing consumers. PrintTicket parts are processed when the XPS Document is printed. PrintTicket parts can be attached only to FixedDocumentSequence, FixedDocument and FixedPage parts and each of these parts attaches no more than one PrintTicket. PrintTickets can provide override settings to be used when printing the part to which they are attached.

SignatureDefinitions Part

Producers may add digital signature requests and instructions to an XPS Document in the form of signature definitions. A producer may sign against an existing signature definition to provide additional signature information. A recipient of the document may also sign the XPS Document against a signature definition—this is referred to as "co-signing." Digital signature definitions are stored in a SignatureDefinitions part. A FixedDocument part refers to a SignatureDefinitions part using a relationship of the SignatureDefinitions type.

DocumentStructure Part

Explicitly authored document structure information is stored in the DocumentStructure part. This part contains the document outline and defines the framework for every element in fixed pages in terms of semantic blocks called stories. Stories are split into StoryFragments parts, which contain content structure markup that defines semantic blocks such as paragraphs and tables.

Document structure markup contains a root <DocumentStructure> element. The <DocumentStructure> element uses a Document Structure namespace.

The DocumentStructure part is referenced by relationship from the FixedDocument part. Consumers may provide an algorithmic construction of the structure of an XPS Document based on a page-layout analysis, but they cannot use such a method to derive structure for any part of the XPS Document included in the DocumentStructure part. For example, a consumer capable of calculating reading order from the layout of the document uses the reading order specified in the DocumentStructure part, even though the derived order may be perceived as preferable to the specified order.

StoryFragments Part

The StoryFragments part contains content structure markup (for example, for tables and paragraphs) associated with a single fixed page.

StoryFragments part markup contains a root <StoryFragments> element. The <StoryFragments> element uses a specified Document Structure namespace.

Having now discussed aspects of the XPS specification as well as example parts that can appear in a package, consider now some example implementation details that can be utilized in connection with packages that conform to the XPS specification.

In terms of the notion of progressivity as it pertains to loading and consuming a package, consider the following.

In one or more embodiments, the various parts of an XPS-compliant package can be considered as a "trunk" that has the following objects that reside at different levels represented by the enumerations:

1. Package
2. DocumentSequence
3. Document
4. PageReference
5. Font, Image, PrintTicket, ColorProfile, RemoteDictionary
6. RemoteDictionaryResource
7. Others (e.g., SignatureDefinitions, StoryFragments, DocumentStructure)

With respect to progressivity in this particular example, trunk objects at the same level are created in the order in which they are presented in an XPS file. For example, an object for Document1 is created before creating an object for Document2. A Page1 reference object is created before creating a Page2 reference object. Resources are added to the object model in the order in which they are referenced for the first time through a relationship from some part in the XPS package.

All trunk objects do not need to be loaded before any specific object is accessed and its methods called. In some instances, as pointed out above, some calls may be the subject of blocking. For example, Document1 can be accessed without Document2 being loaded. Further, Document1 can be accessed without the object model even knowing whether Document2 exists or not. Further, a method Page5Reference.LoadPage( ) can be called to load Page 5 before calling a method Page1Reference.LoadPage( ).

In addition, an entire sub-tree does not need to be available or loaded before an associated trunk element is accessed. For example, the Document1 object can be returned without any of the pages under the document being loaded. Further, the Page 1 reference object can be returned without Page 1 being loaded.

With respect to blocking behavior during progressive loading, consider the following. Even though some objects are being loaded progressively, there still may be blocked access as indicated above. For example, access to Document5 may be blocked until objects for Documents1-4 have been read through. Thus, calling a method DocumentCollection.Get(4) will block until the fifth object is loaded.

With respect to loading order of trunk elements, consider the following. In at least some instances, there can be a couple of seemingly contradictory instances. For example, it would be desirable to be able to load the first page of a document as quickly as possible. So, in this instance, one would want to load the first PageReference of the first document as quickly as possible. This implies a depth first retrieval. Alternatively, it can be desirable to ascertain a count of the documents and a count of the pages as quickly as possible. This implies a breadth first retrieval.

In at least some instances, being able to load the first page of the document as quickly as possible can be more important. Accordingly, in at least some instances, a depth first search of the tree can be conducted. The number of documents can be easily figured out by parsing the DocumentSequence so that too much time is not spent reading the FixedDocument parts. In those instances where a depth first search is conducted, the requested element can be loaded (and the ones prior to it) using the following order:
1. Package
2. DocumentSequence
3. Document
4. PageReference
5. Resources referenced by RequiredResource part from the FixedPage (e.g., Font, Image, PrintTicket, RemoteResource part, etc. . . . )

With respect to a user's experience with progressive loading, consider the following. When a user provides, through their software such as a reader application, a data stream or handle to a loader component, the loader component can create an XPS package object even when no DocumentSequence has been identified. Doing so, a user's call returns quickly although there may be a bit of delay in order to read a package header. Assume a user calls XpsPackage→GetDocumentSequence. In most cases, the DocumentSequence part will be present in the beginning of the object, so it can be parsed and returned quickly. In an unlikely scenario in which the DocumentSequence part is present at the end of the package, this call may take some time to return. Calling DocumentSequence→GetDocuments returns a DocumentCollection quickly. This object may not be aware of how many, if any, documents exist in the package.

In some instances, a user can have two options. First, the user can call DocumentCollection→GetCount. In this case, the call blocks until the full DocumentSequence part is read. When this is done, the number of documents that exist in a package will be known. Second, the user can call DocumentCollection→GetAt[n]. In this case, the call blocks until the DocumentSequence indicating (n+1)th Document is read or it is confirmed that the (n+1)th document does not exist.

Once a document is obtained, its children (i.e. pagecollection) can be obtained. PageReferenceCollection behaves like DocumentCollection. That is, it may not know how many pages are present.

Internal Implementation of Progressivity (Read Only)

This section describes internal implementation of progressivity while doing deserialization (i.e. loading) where the tree is being constructed and not being written to.

When a user provides a data stream or handle to the deserializer (i.e. loader), the deserializer creates an XpsOMTreeInfo object before it creates an XPSPackage object. The XPSPackage object is the actual root of the tree. The XpsOMTreeInfo object has a weak pointer to the XPSPackage object, while the XPSPackage object has a strong pointer to its parent XpsOMTreeInfo object.

In operation, the deserializer or loader creates a new thread (i.e. the background thread) that has the responsibility of loading all of the trunk objects. It will load each child recursively until it reaches PageReference.

Once this thread is done loading the trunk, it will signal to XpsOMTreeInfo. At this stage, the thread can be killed and two options now exist. First, the background thread can message the user thread that its work is done upon which time the background thread can exit. Second, on any future access of the trunk object by the user thread, the trunk will communicate with XpsOMTreeInfo. At this point, the user thread can let go of the background thread.

With respect to coordination between the user thread and the background thread, consider the following.

The background thread can first start by populating the DocumentSequence object. To do so, it can create an empty DocumentSequence object and call DocumentSequence→GetDocuments( ). This DocumentSequence object is available to the caller even while it is being populated. Assume, for example, a client calls Package→GetDocumentSequence( ) on the user thread. Since the tree knows about the background thread, it should not create or populate its own DocumentSequence object. It should use the one created by the background thread. This can be implemented in two ways. First, if a valid object has not been created, the user thread can sleep and retry. That is, the user thread can repeatedly check to see if the background thread has loaded the requested part. If it finds what it is looking for, the user thread can return that part to the user. Second, the user thread can message the background thread to load the DocumentSequence object and wait for a signal from the background thread that the needed part of the document is loaded.

FixedPage content can be loaded on-demand in the user thread. If the user wishes to load the fifth page of the fifth document and neither the fifth page nor the fifth document has been loaded by the background thread, the user thread will block until such time as that page had loaded.

Internal Implementation of Progressivity (Read/Write)

While the trunk is being loaded progressively, if the user attempts to add or delete trunk elements, this operation can be blocked and all trunk elements loaded before the add or delete request is fulfilled. This means that modifications on trunk objects are blocked.

Example System

Figure 5:
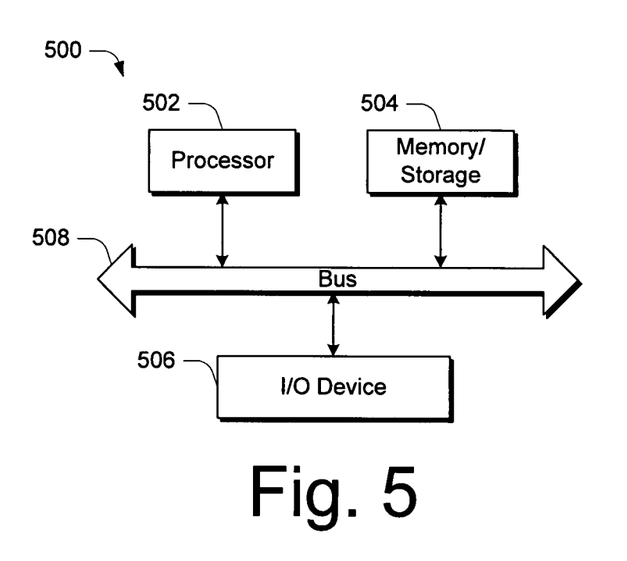
FIG. 5 is a block diagram of an example system that can be utilized to implement one or more embodiments.

FIG. 5 illustrates an example computing device 500 that can implement the various embodiments described above. Computing device 500 can be, for example, computing device 102 of FIG. 1 or any other suitable computing device.

Computing device 500 includes one or more processors or processing units 502, one or more memory and/or storage components 504, one or more input/output (I/O) devices 506, and a bus 508 that allows the various components and devices to communicate with one another. Bus 508 represents one or more of any of several types of bus structures, including a memory bus or memory controller, a peripheral bus, an accelerated graphics port, and a processor or local bus using any of a variety of bus architectures. Bus 508 can include wired and/or wireless buses.

Memory/storage component 504 represents one or more computer storage media. Component 504 can include volatile media (such as random access memory (RAM)) and/or non-volatile media (such as read only memory (ROM), Flash memory, optical disks, magnetic disks, and so forth). Component 504 can include fixed media (e.g., RAM, ROM, a fixed hard drive, etc.) as well as removable media (e.g., a Flash memory drive, a removable hard drive, an optical disk, and so forth).

One or more input/output devices 506 allow a user to enter commands and information to computing device 500, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

CONCLUSION

Various embodiments provide an ability to load documents and access page content associated with documents while the documents are still being loaded. That is, access to documents can be provided during the process of document loading such as, for example, those instances where a document may be in the process of being received via a communication link such as the Internet. In this manner, third-party reader applications or readers can access pages without necessarily knowing how many pages are contained in a particular document.

In at least some embodiments, while a document's structure is being processed in the background, individual pages can be requested. The same can be said for individual documents that comprise a part of a package that contains multiple documents.

In at least some embodiments, multiple threads are utilized to enable a document's structure to be built and to enable a user to access portions of the document while the document is being built or loaded.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
one or more computer readable storage media devices;
computer-readable instructions on the one or more computer readable storage media devices which, when executed, provide a progressive loader configured to use multiple threads, the multiple threads comprising at least a background thread and a user thread, the multiple threads being usable to:
enable a document's structure to be built;
enable access to portions of the document while the document is being loaded;
parse, via the background thread, the document and build an object model associated with the document;
enable, via the user thread, an application programing interface (API) call into the object model to consume portions of the document;
traverse, based on the API call, the object model while the object model is being built to determine whether a requested portion of the document is represented in the object model;
determine that the requested portion of the document is not yet represented in the object model that is being built;
responsive to a determination that the requested portion of the document is not yet represented in the object model, block the user thread until a portion of the object model associated with the requested portion of the document is built;
build, via the background thread, the portion of the object model associated with the requested portion of the document;
message the user thread to indicate that the portion of the object model associated with the requested portion of the document has been built; and
unblock the user thread in response to the message.

2. The system of claim 1, wherein the object model includes a root node and multiple children nodes at least one of which represents a fixed document.

3. The system of claim 1, wherein the background thread is configured to parse a package that contains multiple documents and build an object model associated with the package.

4. The system of claim 3, wherein the object model includes a root node and multiple children nodes at least some of which represent different documents.

5. The system of claim 3, wherein the user thread is configured to enable a user to call into the object model to consume portions of documents contained within the package.

6. The system of claim 5, wherein the progressive loader is configured to block the user thread if the object model does not represent a portion of the package requested by a user.

7. The system of claim 1, wherein the user thread is configured to enable a user to call into the object model associated with the document to consume portions of the document.

8. The system of claim 1, wherein the document comprises part of an XPS package.

9. A computer-implemented method comprising:
creating a user thread to receive and start processing a package that contains one or more documents;
creating a background thread to process and build an object model associated with the package;
receiving, via the user thread, a user request associated with accessing portions of the one or more documents included in the package while the one or more documents are being loaded, the user request including an application programming interface (API) call to the object model to access the portions of the one or more documents;
ascertaining whether a requested document portion has been processed by the background thread by at least traversing the object model while the object model is being built to determine whether the requested document portion is represented in the object model; and
based on a determination that the requested document portion is not represented in the object model:
blocking the user thread until the requested document portion is represented in the object model that is being built;
providing an indication to the user thread that a representation of the requested document portion has been built in the object model;
unblocking the user thread responsive to the indication; and
returning with the requested document portion on the user thread.

10. The method of claim 9, wherein the package comprises an XPS package.

11. The method of claim 9 further comprising:
if the requested document portion has been processed by the background thread by being represented in the object model, returning with the requested document portion.

12. The method of claim 9, wherein the object model includes a root node and multiple children nodes at least one of which represents a fixed document.

13. The method of claim 9, wherein the background thread is configured to parse a package that contains multiple documents and build an object model associated with the package.

14. The method of claim 9, wherein unblocking the user thread comprises unblocking the user thread prior to building a complete object model.

15. The method of claim 9, wherein the object model is built with references to the package and the one or more documents, and the references are used to retrieve and load a corresponding portion of the package or the one or more documents included in the package.

16. A system comprising:
one or more computer readable storage media devices;
computer readable instructions on the one or more computer readable storage media devices which, when executed, implement a method comprising:
creating a user thread to receive and start processing a package that contains one or more documents, the package comprising an XPS package;
creating a background thread to process and build an object model associated with the package;
receiving, via the user thread, a user request associated with accessing portions of the one or more documents included in the package while the one or more documents are being loaded, the user request including an application programming interface (API) call to the object model to access the portions of the one or more documents;
ascertaining whether a requested document portion has been processed by the background thread, the ascertaining being performed by at least traversing the object model while the object model is being built to identify whether the requested document portion is represented in the object model; and
if the requested document portion has not yet been processed by the background thread by being represented in the object model:
blocking the user thread;
messaging the user thread to indicate that a representation of the requested document portion has been built in the object model;
unblocking the user thread in response to the indication; and
returning with the requested document portion on the user thread.

17. The system of claim 16, wherein the background thread is created by the user thread.

18. The system of claim 16, wherein the computer readable instructions, when executed, implement a method further comprising ascertaining one or more of a root of the package, a number of documents contained in the package, a number of pages in each document contained in the package, or a location of each document contained in the package.

19. The system of claim 16, wherein the user request comprises an API call to access the requested document portion that is included in the package.

20. The system of claim 16, wherein the object model includes a root node and multiple children nodes that each represent a different document in the package.

* * * * *